US006741272B1

(12) United States Patent
Kato

(10) Patent No.: US 6,741,272 B1
(45) Date of Patent: May 25, 2004

(54) TELEVISION TELEPHONE APPARATUS IN WHICH A COMPRESSION PROCESS AMOUNT IS CONTROLLED AND INFORMATION PROCESSING METHOD FOR THE TELEVISION TELEPHONE APPARATUS

(75) Inventor: Tatsuya Kato, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/580,177

(22) Filed: May 26, 2000

(30) Foreign Application Priority Data

Jun. 2, 1999 (JP) .......................................... 11-154434

(51) Int. Cl.$^7$ ................................................. H04N 7/14
(52) U.S. Cl. ................................. 348/14.01; 348/14.12; 348/14.13
(58) Field of Search ........................... 348/14.01, 14.02, 348/14.03, 14.04, 14.05, 14.06, 14.07, 14.12, 14.13, 22, 24; 370/260, 261; 709/204, 205

(56) References Cited

U.S. PATENT DOCUMENTS 5,389,965 A  *  2/1995  Kuzma .................... 348/14.12

6,104,705 A  *  8/2000  Ismail et al. ................. 370/260

FOREIGN PATENT DOCUMENTS

| EP | 0703715 | 3/1996 | | |
|---|---|---|---|---|
| GB | 230612 | 5/1997 | | |
| JP | 4-78288 | 3/1992 | | |
| JP | 5-64186 | 3/1993 | | |
| JP | 7-170504 | 7/1994 | | |
| JP | 8-111859 | 4/1996 | | |
| JP | 9-116885 | 5/1997 | | |
| JP | 9-29872 | 11/1997 | | |
| JP | 409298727 A | * | 11/1997 | ............ H04N/7/15 |
| JP | 10-63591 | 3/1998 | | |
| JP | 10-063591 | * | 3/1998 | ............ G06F/13/00 |
| JP | 11-41574 | 2/1999 | | |

* cited by examiner

Primary Examiner—Melur Ramakrishnaiah
(74) Attorney, Agent, or Firm—Foley & Lardner

(57) ABSTRACT

A television telephone apparatus includes a data compressor which is an image compressor or a voice compressor, an inputting unit and a load amount controller. The inputting unit generates a process amount reduction instruction of the image compressor or the voice compressor. The load amount controller controls a compression process amount of the image compressor or the voice compressor such that the compression process amount is reduced.

12 Claims, 4 Drawing Sheets

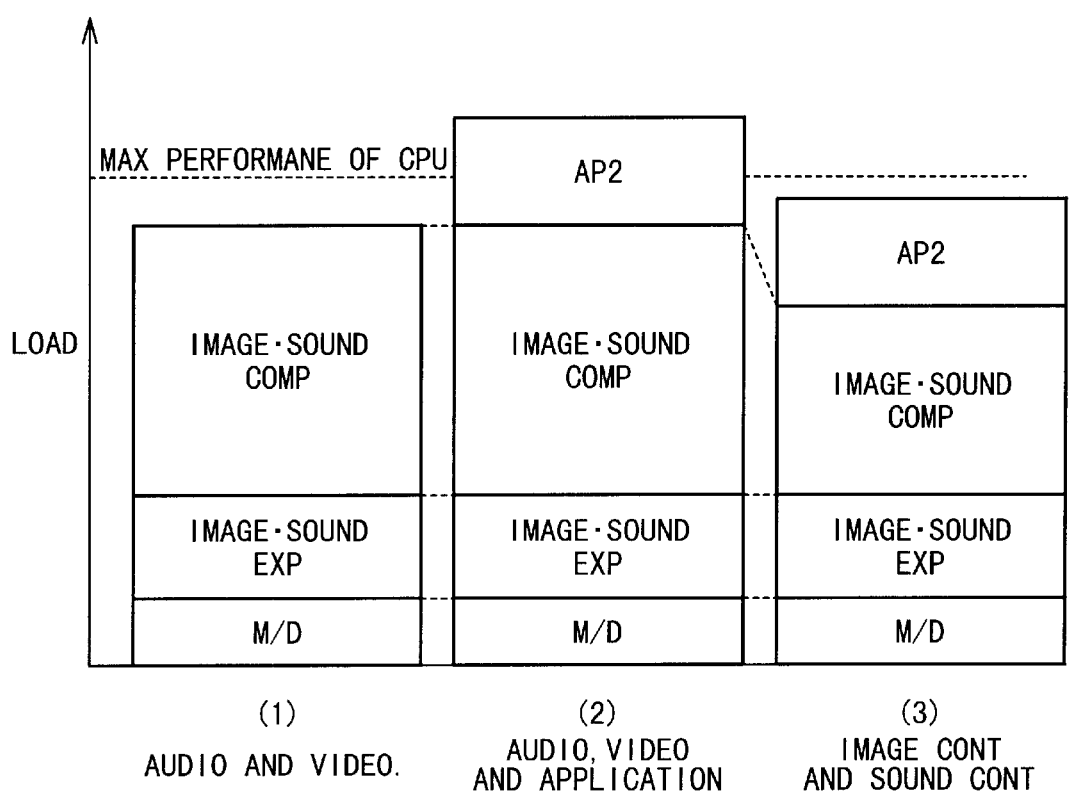

TELEVISION TELEPHONE APPARATUS IN WHICH A COMPRESSION PROCESS AMOUNT IS CONTROLLED AND INFORMATION PROCESSING METHOD FOR THE TELEVISION TELEPHONE APPARATUS

BACKGROUND OF THE INVENTION

1. Field of the Invention

The present invention relates to a television telephone apparatus attained under a software on a personal computer and an information processing method in the television telephone apparatus.

2. Description of the Related Art

FIG. 1 shows a block diagram showing an example of a conventional television telephone apparatus. This television telephone apparatus is provided with a video I/O device 101, a video encoder 102, an audio I/O device 103, an audio encoder 104, a reception path delay device 105, a multiplex separator 106, a modem 107, a modem controller 108 and a system controller 109.

The video encoder 102 performs an image compression process on an image signal outputted by the video I/O device 101. The audio encoder 104 performs a voice compression process on a voice signal outputted by the audio I/O device 103. The multiplex separator 106 performs a multiplexing process on a compressed image data outputted by the video encoder 102 and a compressed voice data outputted by the audio encoder 104. The modem 107 sends the multiplexed data outputted by the multiplex separator 106 to a terminal device of the other partner. Also, the modem 107 sends the multiplexed data received from the terminal device of the other partner to the multiplex separator 106. The multiplex separator 106 separates the compressed voice data and the compressed image data outputted by the modem 107 from each other. After the video encoder 102 performs an extension process on the compressed image data at the terminal device of the other partner, it is displayed by the video I/O device 101. Simultaneously with this display, after the audio encoder 104 performs an extension process on the compressed voice data at the terminal device of the other partner, it is reproduced by the audio I/O device 103.

The above-mentioned television telephone apparatus does not carry out an operational control in accordance with a process amount (load) of information. This increases the process amount of information when another application different from a television telephone application is operated at the same time. This drops the operability of the television telephone apparatus. For example, there may be a case that the process amount (load) of information exceeds that of a CPU, if another application such as a word processor, a spreadsheet or the like is actuated during the operation of the television telephone application. When a load which exceeds the processing ability of the CPU is occurred, the process of each application is not smoothly executed. The situation that the process is not smoothly executed implies, for example, the slower response of the application. The slower response of the application disables the operation to be smoothly executed.

A compression technique of the television telephone application is described in Japanese Patent Laid-open JP-A-H04-78288, JP-A-H09-116885 and JP-A-H11-41574.

SUMMARY OF THE INVENTION

It is an object of the present invention is to provide a television telephone apparatus in which an operability of an application is not degraded even if another application different from a television telephone application is operated at the same time, and an information processing method in the television telephone apparatus.

In order to achieve an aspect of the present invention, a television telephone apparatus includes a data compressor which is an image compressor or a voice compressor, an inputting unit and a load amount controller. The inputting unit generates a process amount reduction instruction for the image compressor or the voice compressor. The load amount controller controls a compression process amount of the image compressor or the voice compressor based on the load amount in response to the process amount reduction instruction such that the compression process amount is reduced.

In the above television telephone apparatus, the process amount reduction instruction for the compression process and a process of an application software exceeds a predetermined threshold level is extended by an application software.

In the above television telephone apparatus, the compression process amount is reduced such that a load amount is set to be lower than the threshold level.

In the above television telephone apparatus, the compression process amount is reduced by a reduction of a frame rate of the image compressor or the voice compressor.

In the above television telephone apparatus, the compression process amount is reduced by a reduction of a resolution of the image compressor or the voice compressor.

In order to achieve an aspect of the present invention, another television telephone apparatus includes an image compressor, a voice compressor, an inputting unit and a load amount controller. The inputting unit generates a process amount reduction instruction for reducing a compression process amount of the image compressor and the voice compressor. The load amount controller detects a load amount of the television telephone apparatus and controls a compression process amount of the image compressor and the voice compressor such that the compression process amount is reduced.

In the above another television telephone apparatus, the process amount reduction instruction is generated when the load amount for the compression process and a process of an application software exceeds a predetermined threshold level.

In the above another television telephone apparatus, the compression process amount is reduced such that the load amount is set to be lower than the threshold value.

In the above another television telephone apparatus, the compression process amount is reduced by a reduction of a frame rate of the image compressor and the voice compressor.

In the above another television telephone apparatus, the compression process amount is reduced by a reduction of a resolution of the image compressor and the voice compressor. In order to achieve an aspect of the present invention, in a method of reduction of the compression process amount of the television telephone apparatus, a load amount of the television telephone apparatus is detected by a load amount controller. Furthermore, a process amount reduction instruction which shows an compression amount reducing instruction of the image compressor or the voice compressor is generated by an inputting unit when the load amount is extended to a predetermined threshold level. Furthermore, a compression process amount of the image compressor or the voice compressor is controlled by a load amount controller such that the compression process amount is reduced.

In the above method of reduction of the compression process amount of the television telephone apparatus, the compression process amount is reduced such that a load by the image compressor or the voice compressor and the application software is set to a lower value of the threshold value.

In the above method of reduction of the compression process amount of the television telephone apparatus, the compression process amount is reduced by a reduction of a frame rate of the image compressor or the voice compressor. In the above method of reduction of the compression process amount of the television telephone apparatus, the compression process amount is reduced by a reduction of a resolution of the image compressor or the voice compressor.

BRIEF DESCRIPTION OF THE DRAWINGS

FIG. 6 shows a view explaining an operation of a television telephone apparatus according to the present invention.

DESCRIPTION OF THE PREFERRED EMBODIMENTS

Figure 1:
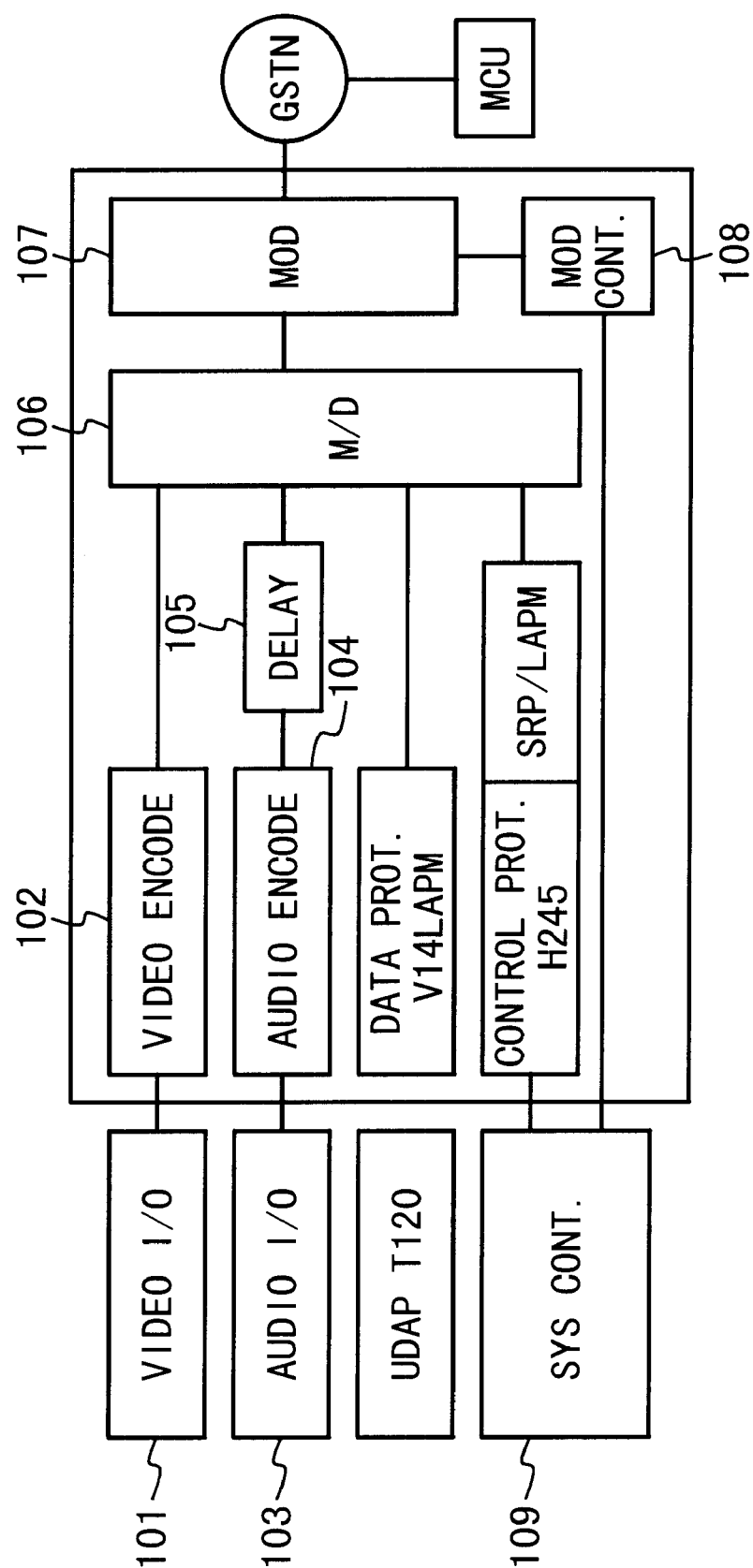
FIG. 1 shows a block diagram showing a conventional television telephone apparatus.
Figure 2:
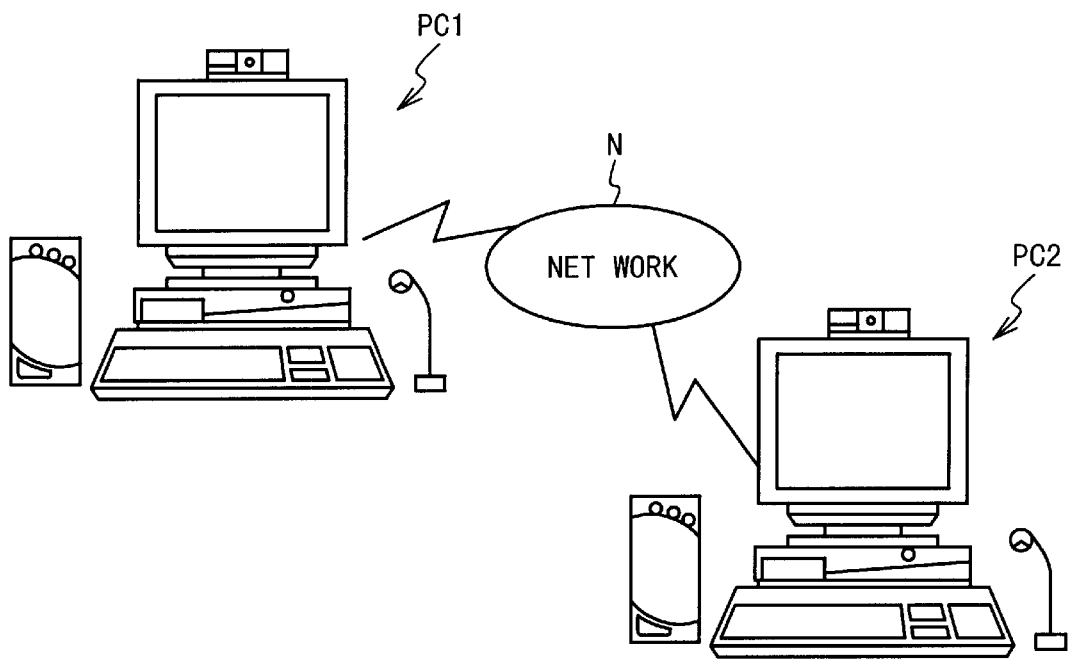
FIG. 2 shows a view showing a schematic appearance of a television telephone apparatus according to the present invention.

Embodiments of the present invention will be described below in detail with reference to the drawings. FIG. 2 shows the concept of a television telephone apparatus according to the present invention. In FIG. 2, a personal computer PC1 constituting a television telephone apparatus is connected through a public line network N to a personal computer PC2 constituting a television telephone apparatus.

Figure 3:
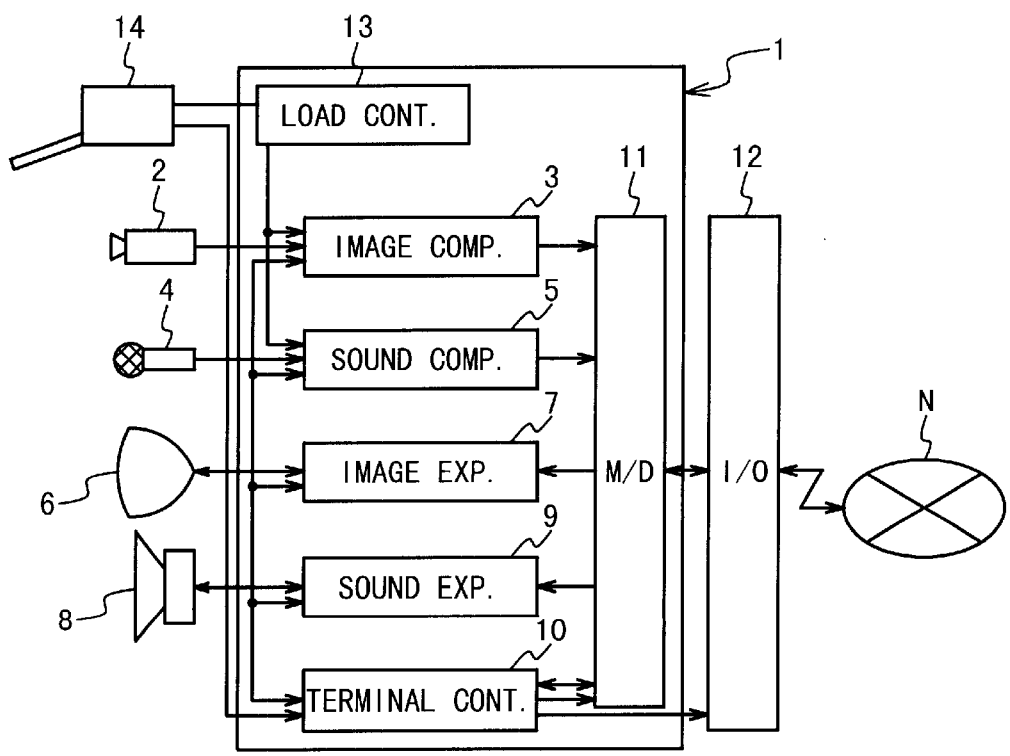
FIG. 3 shows a block diagram showing a television telephone apparatus according to the present invention.

FIG. 3 shows the detailed configuration of the television telephone apparatus according to the present invention. In FIG. 3, the television telephone apparatus is provided with a video camera 2, a microphone 4, a display 6, a speaker 8, an image compressor 3, a voice compressor 5, an image extension device 7, a voice extension device 9, a terminal controller 10, a multiplex recovery device 11, a line interface 12, a load amount controller 13, and an operational input device 14. The television telephone application 1 is connected to the line interface 12, the video camera 2, the microphone 4, the display 6 and the speaker 8. The image compressor 3 is connected to the video camera 2. The voice compressor 5 is connected to the microphone 4. The image extension device 7 is connected to the display 6. The voice extension device 9 is connected to the speaker 8. The terminal controller 10 is connected to the image compressor 3, the voice compressor 5, the image extension device 7 and the voice extension device 9. The multiplex recovery device 11 is connected to the image compressor 3, the voice compressor 5, the image extension device 7, the voice extension device 9 and the terminal controller 10. The line interface 12 is connected to the multiplex recovery device 11 and the terminal controller 10. The load amount controller 13 is connected to the image compressor 3 and the voice compressor 5. The operational input device 14 is connected to the terminal controller 10 and the load amount controller 13.

The video camera 2 photographs a user who operates a television telephone, and outputs an image signal. The image compressor 3 performs a compression process on the image signal outputted by the video camera 2, and generates the compressed image signal. The image compressor 3 receives a terminal control signal from the terminal controller 10, and further receives a system load control signal from the load amount controller 13. The microphone 4 generates a voice signal corresponding to a voice of a user who operates a television telephone application. The voice compressor 5 performs the compression process on the voice signal outputted by the microphone 4, and generates the compressed voice signal. The voice compressor 5 receives the terminal control signal from the terminal controller 10, and further receives the system load control signal from the load amount controller 13.

The image extension device 7 performs an extension process on a compressed image signal at a terminal device of the other partner outputted by the multiplex recovery device 11, and outputs an image signal corresponding to the compressed image signal. The display 6 displays thereon the image signal at the terminal device of the other partner outputted by the image extension device 7. The voice extension device 9 performs the extension process on the compressed voice signal at the terminal device of the other partner outputted by the multiplex recovery device 11, and generates a voice signal corresponding to the compressed voice signal. The speaker 8 reproduces the voice signal at the terminal device of the other partner outputted by the voice extension device 9. The terminal controller 10 outputs a system information sent to and received from the terminal device of the other partner, to the multiplex recovery device 11, and further receives the system information within the terminal device of the other partner, from the multiplex recovery device 11. And, the terminal controller 10 sends the terminal control signal to the image compressor 3, the voice compressor 5, the image extension device 7, the voice extension device 9, the multiplex recovery device 11 and the line interface 12, and then sets and controls the operations at the respective devices.

The multiplex recovery device 11 receives the system information from the terminal controller 10, receives the compressed image signal from the image compressor 3, and receives the compressed voice signal from the voice compressor 5, and then carries out a multiplex process. The multiplex recovery device 11 sends a multiplex data obtained by the multiplex process to the line interface 12. Moreover, the multiplex recovery device 11 receives the multiplex data at the terminal device of the other partner from the line interface 12, and then performs a recovery process on the multiplex data. The compressed image signal at the terminal device of the other partner obtained by the process for recovering the multiplex data is outputted to the image extension device 7. The compressed voice signal at the terminal device of the other partner obtained by that recovery process is outputted to the voice extension device 9. Also, the system information at the terminal device of the other partner is outputted to the terminal controller 10.

The line interface 12 sends the multiplex data received from the multiplex recovery device 11, through the public line network N to the terminal device of the other partner. Moreover, the line interface 12 sends the multiplex data at the terminal device of the other partner, which is received through the public line network N from the terminal device of the other partner, to the multiplex recovery device 11. In the load amount controller 13, when a user who carries out a television telephone communication actuates another application, in response to a process amount reduction instruction based on the operation of the operational input device 14 carried out by the user, the system load control signal is sent to the image compressor 3 and the voice compressor 5.

Figure 4:
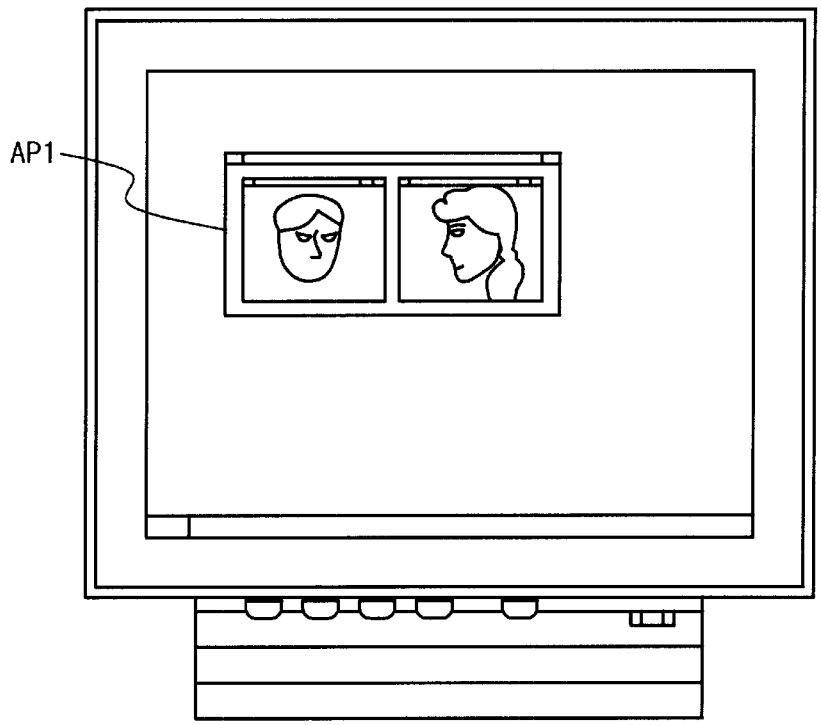
FIG. 4 shows a view showing an operational state of an application AP1 according to the present invention.
Figure 5:
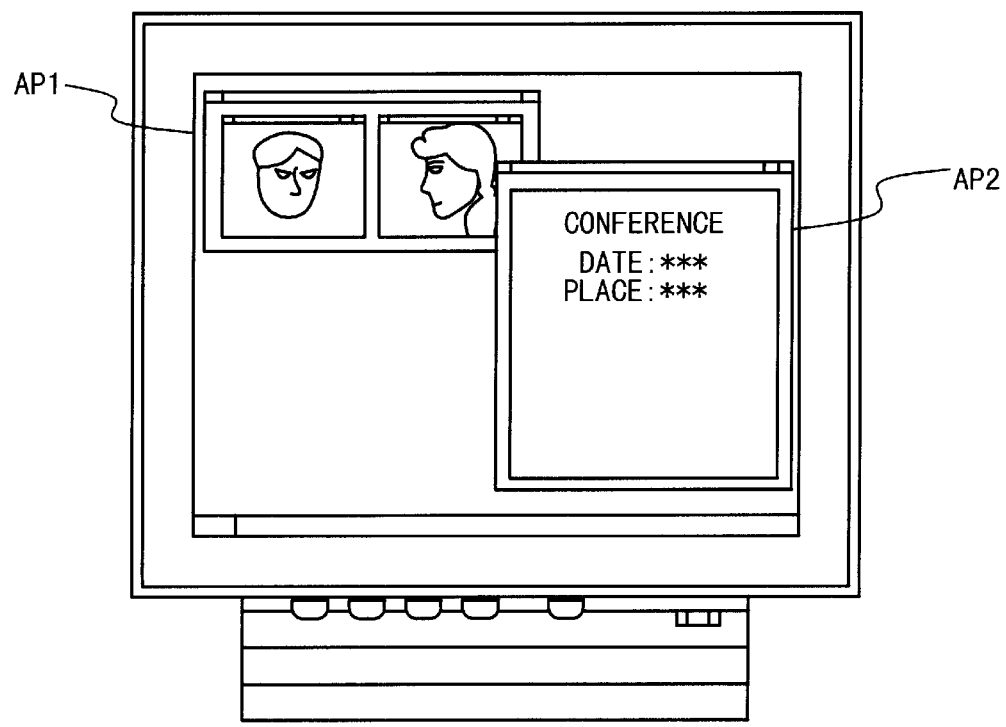
FIG. 5 shows a view showing an operational state of an application AP2 according to the present invention.

FIG. 4 shows a first display example according to the present invention. FIG. 4 shows a display screen of the display 6 when a television telephone application AP1 is operated on a personal computer. FIG. 5 shows a second display example according to the present invention. FIG. 5 shows a display screen of the display 6 when the television telephone application AP1 and another application AP2 (Application software) are operated on the personal computer.

FIG. 6 shows a load on a CPU according to the present invention. In FIG. 6, the timing(1) shows a load (process amount) when only the television telephone application AP1 is operated on the personal computer. The timing(2) shows a load when the television telephone application AP1 and another application AP2 are operated on the personal computer and then the load amount controller 13 does not output the system load control signal and does not perform the system load control on the image compressor 3 and the voice compressor 5. And, the timing(3) shows a load when the television telephone application AP1 and another application AP2 are operated on the personal computer and then the load amount controller 13 outputs the system load control signal to the image compressor 3 and the voice compressor 5 and also performs the system load control on them.

The operation of the television telephone apparatus according to the present invention will be described below with reference to FIGS. 1 to 4. The television telephone apparatus according to the present invention is driven in the network constituted by the computer PC1 and the computer PC2 which are connected through the public line network N to each other.

When a user tries a communication with the terminal device of the other partner by using the television telephone application AP1, the image compressor 3 performs the compression process on the image signal outputted by the video camera 2. The voice compressor 5 performs the compression process on the voice signal outputted by the microphone 4. The multiplex recovery device 11 performs the multiplex process on the compressed voice signal and the compressed image signal obtained by the compression process. The multiplexed compressed image signal and compressed voice signal are sent through the line interface 12 to the terminal device of the other partner. On the other hand, the multiplex recovery device 11 performs the recovery process on the multiplex data sent by the terminal device of the other partner receiving through the line interface 12. The image extension device 7 and the voice extension device 9 perform the extension processes on the recovered compressed image signal and compressed voice signal, respectively. The extended signals are displayed on the display 6 and reproduced in the speaker 8. The communication of the image and the voice is carried out by the above-mentioned processes.

Usually, when the above-mentioned processes are executed under a software on the computers PC1, PC2, the image and voice compression processes requiring the complex calculation processes cause a huge load to be assigned to the CPU. Moreover, a problem is brought about when the television telephone application AP1 is executed on the computers PC1, PC2 and also the application AP2 such as a word processor, a spreadsheet or the like is executed. That is, the application AP2 is not smoothly executed because of the load resulting from the television telephone application AP1. Thus, trouble is induced in the operability of the computers PC1, PC2.

In the present invention, the process amount reduction instruction is sent to the load amount controller 13, in accordance with the operation of the operational input device 14 carried out by the user trying the communication through the television telephone before the actuation of the application AP2.

The load amount controller 13, when receiving the process amount reduction instruction, generates a system load control signal. That system load control signal is sent to the image compressor 3 and the voice compressor 5.

The image compressor 3, when receiving the system load control signal outputted by the load amount controller 13, performs the compression process on the image signal outputted by the video camera 2, so as to reduce the process amount of the CPU. The process in the image compressor 3 is sufficient if it can obtain the consequence of the reduction in the process amount of the CPU. So, that content may include, for example, a method for removing only a temporal interval between input image captures without changing various setting values in the compression process, a method for reducing only an image resolution (CIF→QCIF) without changing the various setting values in the compression process and the like. In the television telephone application, it is possible to set a frame rate, an image resolution and the like by using GUI.

Typically, the margin for the load on the CPU resulting from the reduction in the frame rate or the image resolution is used in carrying out the complex processes for the sake of the improvement of an image quality. Such operation typically disables the change in the process amount of the CPU, namely, the load, even if the frame rate or the image resolution is reduced.

On the other hand, in the embodiment of the present invention, the image compressor 3 reduces the frame rate, and simultaneously maintains the image quality in its original state. Or, it intentionally drops the image quality to thereby reduce the process amount of the CPU, namely, the load. Similarly, it drops the image resolution, and simultaneously maintains the image quality in its original state, or intentionally drops the image quality to thereby attain the reduction in the process amount of the CPU. In this way, the image compressor 3, when receiving the system load control signal from the load amount controller 13, functions so as to reduce the process amount of the CPU and further drop the system load. Similarly, the voice compressor 5, when receiving the system load control signal from the load amount controller 13, performs the compression process on the voice signal received from the microphone 4, so as to reduce the process amount of the CPU. The method for reducing the process amount of the CPU in the voice compressor 5 may include a method for judging that there is no voice input and then stopping a part of the processes, a method for switching to the voice compression method of employing another simple process and the like. As mentioned above, the voice compressor 5, when receiving the system load control signal, also functions so as to reduce the process amount of the CPU and further drop the system load As a result, when the user operates the operational input device 14 and then enters the process amount reduction instruction, the load amount controller 13 generates the system load control signal. That system load control signal is sent to the image compressor 3 and the voice compressor 5. This results in the drop in the load on the CPU with regard to the television telephone application. Also, as a device for the user to give the process amount reduction instruction to the load amount controller 13 before actuating another application AP2, there may be a method for mounting a button of GUI in the load amount controller 13 and then switching between ON and OFF of the load control, a method for mounting a slide bar of GUI in the television telephone application AP1 and gradually carrying out the load control and the like.

The timing(1) is a view showing a system load when only the television telephone application AP1 is actuated on the personal computers PC1, PC2 and then the television telephone communication is done. Typically, the television telephone application has a large process amount of CPU especially necessary for the image compression process and the voice compression process. For this reason, most of the system load of the entire television telephone application is typically used for the maximum ability of the CPU. The timing(2) is a view showing a system load in the condition that the television telephone application AP1 and another application AP2 having no relation to the television telephone are actuated on the personal computer PC1 or PC2 and then the load amount controller 13 does not output the system load control signal.

There may be the following case with regard to an occurrence of an process amount. That is, in addition to the condition of the timing(1), the actuation of another application AP2 causes the system load of the personal computer to exceed the maximum ability of the CPU. At this time, typically, the television telephone application AP1 and another application AP2 are respectively executed while the other process wait state is sandwiched between them. Thus, in both the applications, it is impossible to obtain the satisfactory operability. The timing(3) shows a view showing a system load in the condition that the television telephone application AP1 and another application AP2 are actuated on the personal computer PC1 or PC2 and then the load amount controller 13 outputs the system load control signal. When the process amount reduction instruction in accordance with the operation of the operational input device 14 carried out by a user is sent to the load amount controller 13, the load amount controller 13 sends the system load control signal to the image compressor 3 and the voice compressor 5. In this case, the image compressor 3 and the voice compressor 5 respectively function so as to reduce the process amount of the CPU, as compared with the case of the timing(1). This operation enables the reduction of the system load necessary for the operation of the television telephone application. So, even if the load is increased in conjunction with the operation of another application AP2, the load on the CPU can be set within the range of the maximum ability of the CPU. Thus, the television telephone communication can be done without degrading the operability of another application.

The above-mentioned embodiment of the present invention may be designed such that when the process amount reduction instruction resulting from the operation of the operational input device 14 carried out by the user is sent to the load amount controller 13, the load amount controller 13 sends the system load control signal to any one of the image compressor 3 and the voice compressor 5.

Advantageous Effects of the Invention

According to the present invention, when the television telephone application and another application except the television telephone are operated at the same time, the process amount of the image compressor or the voice compressor can be reduced. This reduction involves the drop in the load on the CPU. The drop in the load on the CPU enables the setting of the number of applications with which the CPU can cope, namely, the situation with which the CPU can cope. Thus, even if the number of applications to be driven is increased, a predetermined operability can be maintained in all the applications.

What is claimed is:

1. A television telephone apparatus comprises:
   a computer device operable under a first application as a data compressor for performing voice and image compression for transmitting image and voice data and operable under at least one of another application not associated with said voice and image compression;
   an inputting unit generating a process amount reduction instruction in response to actuation by a user for reducing a compression process amount of the data compressor; and
   a load amount controller detecting a load amount of the television telephone apparatus including the load amount required by said at least one other application and controlling only the compression process amount of the date compressor based on the load amount in response to the process amount reduction instruction such that the compression process amount is reduced without reducing processing of said at least one other application;
   wherein the process amount reduction instruction is generated when the load amount for the compression process and a process of an application software exceeds a predetermined threshold level.

2. A television telephone apparatus as claimed in claim 1, wherein the compression process amount is reduced such that the load amount is set be lower than the threshold level.

3. A television telephone apparatus as claimed in claim 2, wherein the compression process amount is reduced by reducing a frame rate of the compression process of the data compressor.

4. A television telephone apparatus as claimed in claim 2, wherein the compression process amount is reduced by reducing a resolution of the data compressor.

5. A television telephone apparatus comprises;
   a computer device operable under a first application as a data compressor for performing voice and image compression for transmitting image and voice data and operable under at least one of another application not associated with said voice and image compression;
   a voice compressor compressing a voice data;
   an inputting unit generating a process amount reduction instruction in response to actuation by a user for reducing a compression process amount of the image compressor and the voice compressor; and
   a load amount controller detecting a load amount of the television telephone apparatus including the load amount required by said at least one other application and controlling only the compression process amount of the image compressor and the voice compressor based on the load amount in response to the process amount reduction instruction such that the compression process amount is reduced without reducing processing of said at least one other application;
   wherein the process amount reduction instruction is generated when the load amount for the compression process and a process of an application software exceeds a predetermined threshold level.

6. A television telephone apparatus as claimed in claim 5, wherein the compression process amount is reduced such that the load amount is set to be lower than the threshold value.

7. A television telephone apparatus as claimed in claim 6, wherein the compression process amount is reduced by reducing a frame rate of the compression process of the image compressor and the voice compressor.

8. A television telephone apparatus as claimed in claim 6, wherein the compression process amount is reduced by reducing a resolution of the image compressor and the voice compressor.

9. A method of reducing of the compression process amount of the television telephone apparatus, comprises:

operating a computing device under a first application as a data compressor for performing voice and image compression for transmitting image and voice data and operable under at least one of another application not associated with said voice and image compression;

detecting a load amount of the television telephone apparatus;

generating in response to actuation by a user a process amount reduction instruction for the compression process amount of a data compressor when the load amount, including said at least one other application, exceeds a predetermined threshold level; and controlling only the compression process amount of the data compressor based on the process amount reduction instruction such that the compression process amount is reduced without reducing processing of said at least one other application.

10. A method of reducing of the compression process amount of the television telephone apparatus as claimed in claim 9, wherein the compression process amount is reduced such that the process amount is set to be lower than the threshold level.

11. A method of reducing of the compression process amount of the television telephone apparatus as claimed in claim 9:

wherein the compression process amount is reduced by reducing a frame rate of the data compressor.

12. A method of reducing of the compression process amount of the television telephone apparatus as claimed in claim 9:

wherein the compression process amount is reduced by reducing a resolution of the image compressor or the voice compressor.

* * * * *